UNITED STATES PATENT OFFICE.

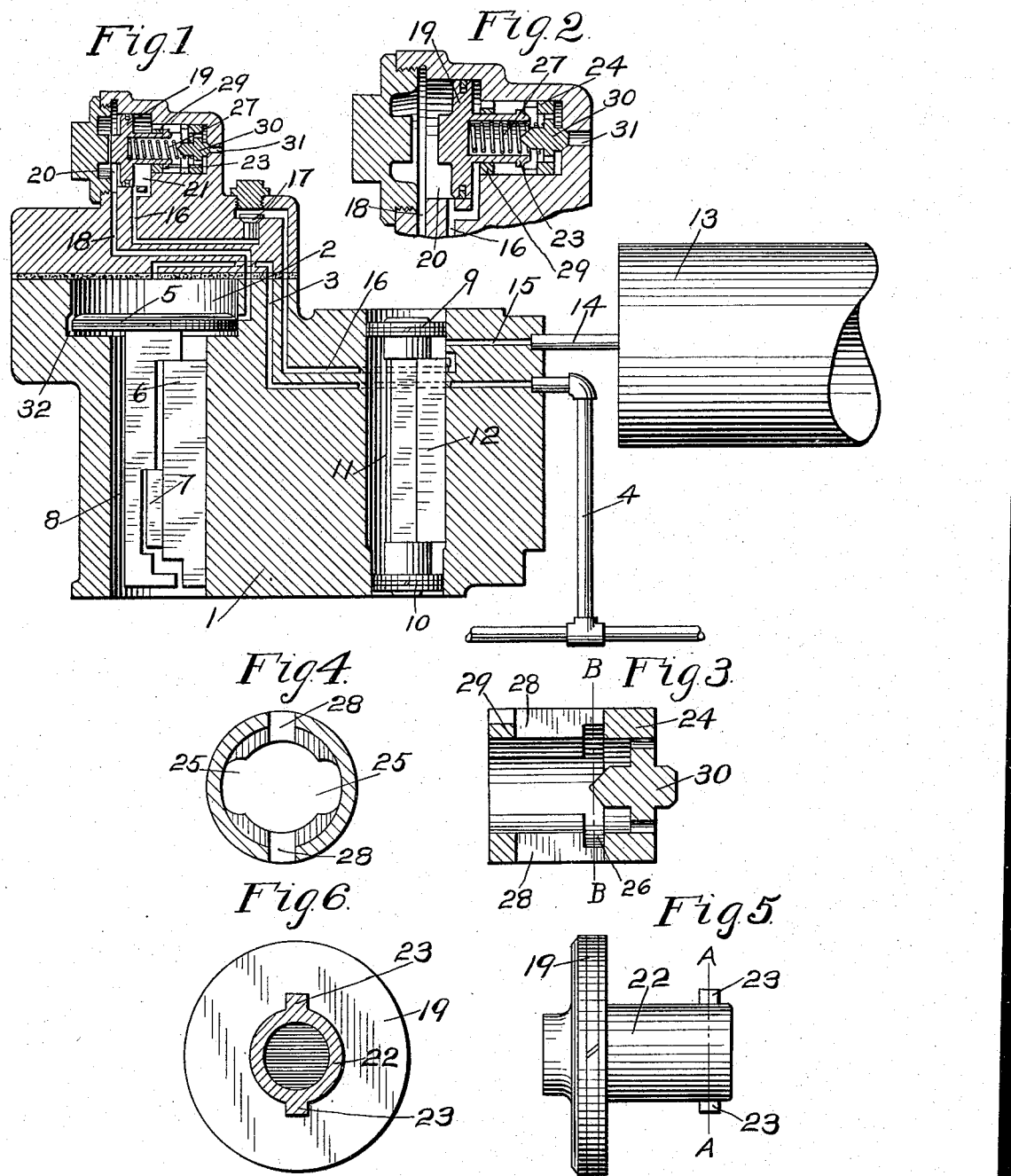

WALTER V. TURNER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,174,106.  Specification of Letters Patent.  Patented Mar. 7, 1916.

Original application filed September 26, 1914, Serial No. 863,635. Divided and this application filed June 2, 1915. Serial No. 31,667.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a valve mechanism for controlling the application and release of the brakes, the present application being a division of application Serial No. 863,635, filed September 26, 1914.

In connection with apparatus of the above character, an additional reservoir, such as the so-called emergency reservoir, is frequently employed, and in order to charge this reservoir with fluid under pressure, a connection containing a non-return check valve is provided between the brake pipe and the reservoir. There is some possibility of this check valve developing a leak, and if after an application of the brakes, the equalizing valve parts on the car having the leaky check valve should happen to move to release position by reason of an auxiliary reservoir leak or otherwise, fluid may then flow from the additional reservoir to the brake pipe and thus raise the brake pipe pressure sufficiently to cause all the triple valves in the train to move to release position.

The principal object of my invention is to provide means for preventing leakage from the additional reservoir from flowing into the brake pipe.

In the accompanying drawing; Figure 1 is a central sectional view of a valve mechanism for controlling the application and release of the brakes with my invention embodied therein; Fig. 2 an enlarged sectional view of the valve portion for relieving leakage from the reservoir, showing the same in position for charging the reservoir from the brake pipe; Fig. 3 a central longitudinal section of the frame associated with the collapsible piston of the relief valve device; Fig. 4 a transverse section thereof on the line B—B of Fig. 3; Fig. 5 a side elevation of the collapsible piston of the relief valve device; and Fig. 6 a transverse section thereof on the line A—A of Fig. 5

For the purpose of illustrating one application of my invention, I have shown the same applied in Fig. 1 to a brake application and release valve mechanism comprising a casing 1 having a piston chamber 2 connected by passage 3 to brake pipe 4 and containing the usual equalizing piston 5. Said piston operates the main and graduating slide valves 6 and 7 contained in valve chamber 8 which is connected to the usual auxiliary reservoir. The valve mechanism also includes a separate release valve device comprising connected piston heads 9 and 10 having an intermediate valve chamber 11 containing release slide valve 12. In the present instance, the emergency reservoir 13 is connected by pipe 14 and passage 15 to the valve chamber 11.

In order to charge the valve chamber 11 and the emergency reservoir 13, a charging passage 16, controlled by the release slide valve 12, is provided, said passage containing the usual non-return check valve 17. According to my invention, communication from the charging passage 16 to passage 18, leading to piston chamber 2, is controlled by a relief valve device comprising a collapsible piston 19 having the chamber 20 at one side open to passage 18, and having chamber 21 at the opposite side open to passage 16, the passage 16 having branches so arranged that when the piston is in one position, communication is closed between passages 16 and 18 and when the piston is moved outwardly, said passages are connected. The piston 19 is provided with a hollow stem 22 having projections 23 and said stem is mounted in a hollow frame 24 having interior grooves 25 terminating at the inner end in an annular recess 26.

The parts are assembled by inserting the coil spring 27 within the frame and then forcing the piston into the frame against the resistance of the spring, the projections 23 moving in the grooves 25. When the projections reach the recess 26, the piston is turned through an angle of about forty-five degrees, so that the projections 23 aline with slots 28. If the piston is now released, the spring forces the piston outwardly, the projections 23 being guided in the slots 28, so that normally the projections will bear against the inner flange portion 29 of the frame, as shown in Fig. 1. The frame 24 also carries a valve 30 for controlling a vent port 31 from chamber 21.

In operation, fluid supplied to the brake pipe 4, flows through passage 3 to piston chamber 2 and thence through the usual feed groove 32 to valve chamber 8, charging the auxiliary reservoir. The piston 5 being in full release position, passage 18 is open, so that fluid flows through said passage from the brake pipe to chamber 20 of the relief valve device and piston 19 is thereby shifted to the position shown in Fig. 2. This opens communication from passage 18 to passage 16 and fluid from the brake pipe can then flow past check valve 17 to release valve chamber 11, if the release valve 12 is in release position, as shown in Fig. 1. Fluid supplied to valve chamber 11 then flows through passage 15 and pipe 14, charging the emergency reservoir 13. When the fluid pressure in the emergency reservoir has become substantially equal to brake pipe pressure, the piston 19 will be returned to the normal position, shown in Fig. 1, by the spring 27, so that communication between the reservoir and the brake pipe is closed.

If the check valve 17 should leak and the brake pipe pressure happens to be less than the emergency reservoir pressure, when the triple valve piston is shifted to release position, then the piston 19 will be shifted by the higher pressure in chamber 21 so as to lift the valve 30 from its seat and permit fluid to vent from chamber 21 and passage 16 to the atmosphere. When the pressure of fluid flowing from the emergency reservoir to vent port 31 has been reduced to a point slightly less than the brake pipe pressure, the piston 19 will be operated to return the valve 30 to its seat and thereby prevent further venting of fluid from the emergency reservoir.

By means of the hereinbefore described construction, fluid is prevented from flowing back to the brake pipe from the emergency reservoir and thus tending to effect the release of the brakes, in case a triple valve should happen to be unintentionally shifted to release position through leakage from the auxiliary reservoir or otherwise.

Having now described my invention, what I claim as new and desire to secure by Letters Patent, is:—

1. In a fluid pressure brake, the combination with a brake pipe and a reservoir adapted to be charged with fluid under pressure from the brake pipe through a charging passage, of means for venting fluid from said passage in excess of the pressure in the brake pipe.

2. In a fluid pressure brake, the combination with a brake pipe and a reservoir adapted to be charged with fluid under pressure from the brake pipe, of a check valve for preventing back flow from the reservoir to the brake pipe and means for venting fluid leaking past the check valve to prevent flow of same to the brake pipe.

3. In a fluid pressure brake, the combination with a brake pipe and a reservoir adapted to be charged from the brake pipe, of a check valve for preventing back flow from the reservoir to the brake pipe, a piston subject to the opposing pressures of the brake pipe and fluid leaking past the check valve, and a valve operated by said piston for venting said leakage fluid when the pressure thereof exceeds the brake pipe pressure.

4. In a fluid pressure brake, the combination with a brake pipe and a reservoir adapted to be charged from the brake pipe, of a check valve for preventing back flow from the reservoir to the brake pipe, a valve for venting leakage past said check valve, and a piston having a movement relative to said valve for operating the same when the pressure of leakage fluid exceeds the brake pipe pressure.

5. In a fluid pressure brake, the combination with a brake pipe, and a reservoir, of a piston operated by brake pipe pressure for opening communication through which the reservoir is charged with fluid under pressure from the brake pipe, a check valve for preventing back flow from the reservoir to the brake pipe, and a valve operated by said piston for venting fluid leaking past said check valve.

6. In a fluid pressure brake, the combination with a brake pipe, an emergency reservoir adapted to be charged with fluid under pressure from the brake pipe, and a check valve for preventing return flow from the reservoir to the brake pipe, of a valve adapted to vent fluid leaking past said check valve, and a piston having a movement relative to said valve for opening communication through which fluid is supplied from the brake pipe to the reservoir and adapted to actuate said valve for venting fluid leaking past said check valve when the pressure of the leakage fluid exceeds the brake pipe pressure.

7. In a fluid pressure brake, the combination with a brake pipe, an emergency reservoir adapted to be charged with fluid under pressure from the brake pipe, and a check valve for preventing return flow from the reservoir to the brake pipe, of a valve adapted to vent fluid leaking past said check valve, and a piston subject on one side to brake pipe pressure and having a movement relative to said valve for opening communication through which the reservoir is charged from the brake pipe and operated by the pressure of fluid leaking past said check valve to open said valve.

In testimony whereof I have hereunto set my hand.

WALTER V. TURNER.

Witnesses:
A. M. CLEMENTS,
S. W. KEEFER.